C. A. M. RIBERA AND F. A. SERRE.
AUTOMATIC COUPLING DEVICE FOR RAILWAY CARS.
APPLICATION FILED AUG. 3, 1921.

1,427,759.

Patented Aug. 29, 1922.
3 SHEETS—SHEET 3.

Inventors
C. A. M. Ribera
F. A. Serre
By Marks&Clark
Attys.

UNITED STATES PATENT OFFICE.

CHARLES ANDRÉ MARIE RIBÉRA AND FERNAND ALFRED SERRE, OF NIMES, FRANCE.

AUTOMATIC COUPLING DEVICE FOR RAILWAY CARS.

1,427,759.  Specification of Letters Patent.  Patented Aug. 29, 1922.

Application filed August 3, 1921. Serial No. 489,616.

*To all whom it may concern:*

Be it known that we, CHARLES ANDRÉ MARIE RIBÉRA and FERNAND ALFRED SERRE, citizens of the French Republic, residing at Nimes, Gard, in the Republic of France, have invented new and useful Improvements in Automatic Coupling Devices for Railway Cars, for which we have filed an application in France, July 16th, 1920, and of which the following is a specification.

This invention relates to an automatic car coupling device for railroad cars or like vehicle running upon rails, and is chiefly characterized by the use of a hook cooperating with a ring, or like members disposed upon each car and adapted to pivot independently from each other about a horizontal shaft mounted on the car. The said hook and ring are normally maintained in a position whereby they may be coupled to the respective members of the second car comprising a ring and hook, by reason of a counter-weight and an adjustable screw stop piece which are disposed upon each of the said members through the medium of arms secured to the corresponding member, hook or ring, and in this manner the coupling may be carried out under the action of the said counterweights.

Another characteristic feature of this invention resides in the use of an uncoupling device whereby the two cars may be separated and the coupling device placed in the inoperative position. Other features will be set forth in the following description.

The accompanying drawings show by way of example a form of construction of the said invention, wherein.

Figure 1:
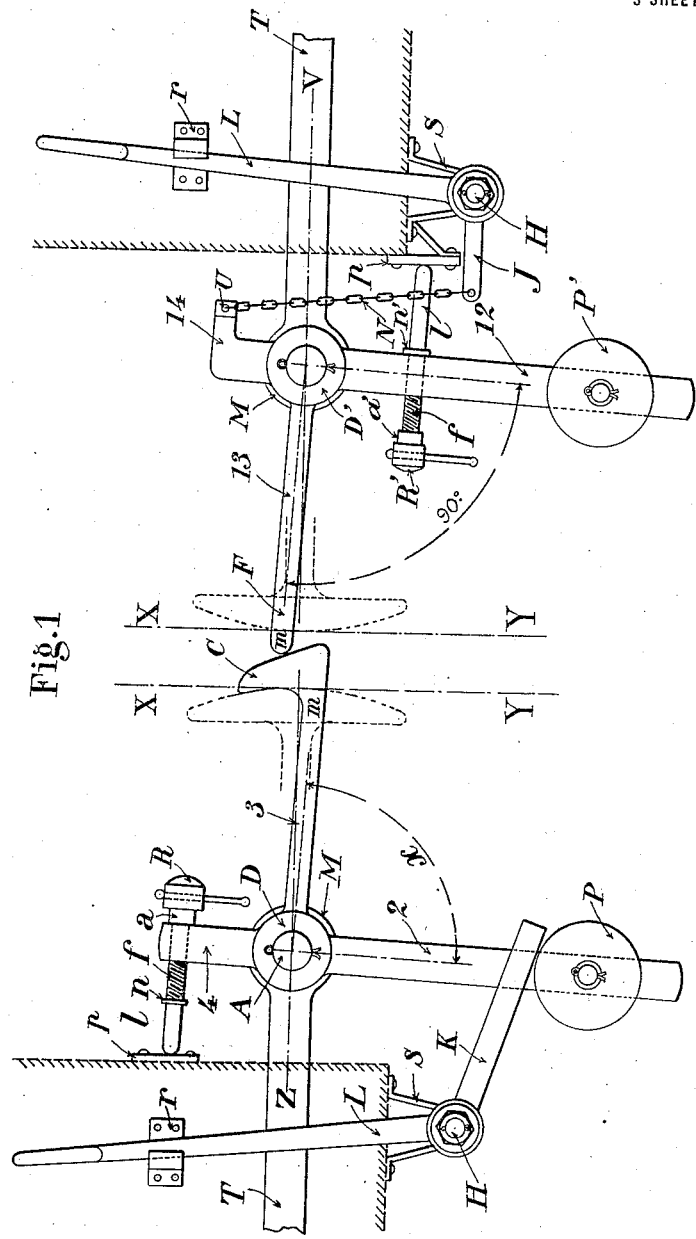
Fig. 1 is a side elevation of an automatic coupling device according to this invention.

The vehicle is provided at either end with a male member represented by the hook C and a female member consisting of the ring F, the male member being mounted in each case on the left and the female member on the right hand side when facing the end of the car. The male and female members each have a length which is so calculated that the point of contact, after coupling, shall be located on the buffer line X—Y. The male member consists essentially of a piece 2, 3, 4 of T shape with unequal arms which is secured to the sleeve D, this latter being loosely revoluble on a horizontal axle A which may be disposed in an aperture M of the draw-bar T. The large arm 2 has disposed thereon a counterweight P slidable upon the said arm but secured in the fixed position by means of a cross pin. The intermediate arm 3 carries the male coupling member proper or hook C. The arc formed by the inner side of the said hook has for its radius the distance from the center of the axle A to the buffer line X—Y. The small arm 4 has formed at the end thereof an aperture O through which passes a stop screw R to be described hereunder.

The angle $x$ formed by the two arms 2 and 3 is designed in such manner that when the arm 2 is in the vertical position, the point $m$ of the hook C shall be situated above the theoretical buffer axis Z—V by a distance equal to the maximum flexion of the car suspension springs. As for the male member, the female member comprises a T-shaped piece with unequal arms 12, 13, 14 mounted upon a sleeve D' which is disposed upon the same axle as the male organ. The large arm 12 is provided with a slidable counterweight P' which is secured in fixed position in the same manner as for that of the male member; the large arm has also formed therein below the axle A an aperture through which passes the stop screw R'. The intermediate arm 13 carries the female member proper or ring F. The small arm has formed at the end thereof a heel or bent arm U. The angle between the arms 12 and 13 of the female member is 90°.

Each of the stop screws R, R' comprises a head provided with a cross pin, a screwthreaded portion $f$, a shoulder or washer provided with a pin $n$, $n'$ and a smooth end portion $l$. The length of the screwthreaded portion $f$ depends upon the distance of the same from the axle A, the respective lengths of the arms 3 and 13, and the amount of bending admitted for the springs of the vehicle in question. The screwthreaded part is screwed into a corresponding aperture in the arm 4 or 14 of the male or the female member. The amount of movement of the regulating stop screw determining the stroke in the direction of the theoretical buffer axis Z V. This theoretical axis Z V is the line passing through the buffer centers of empty cars. The said movement of the screw is always limited to the proper amount by the heads or shoulders $a$, $a'$ and $n$ $n'$. The points of the regulating screw enters in contact with a stop plate $p$ secured to the vehicle.

Figure 2:
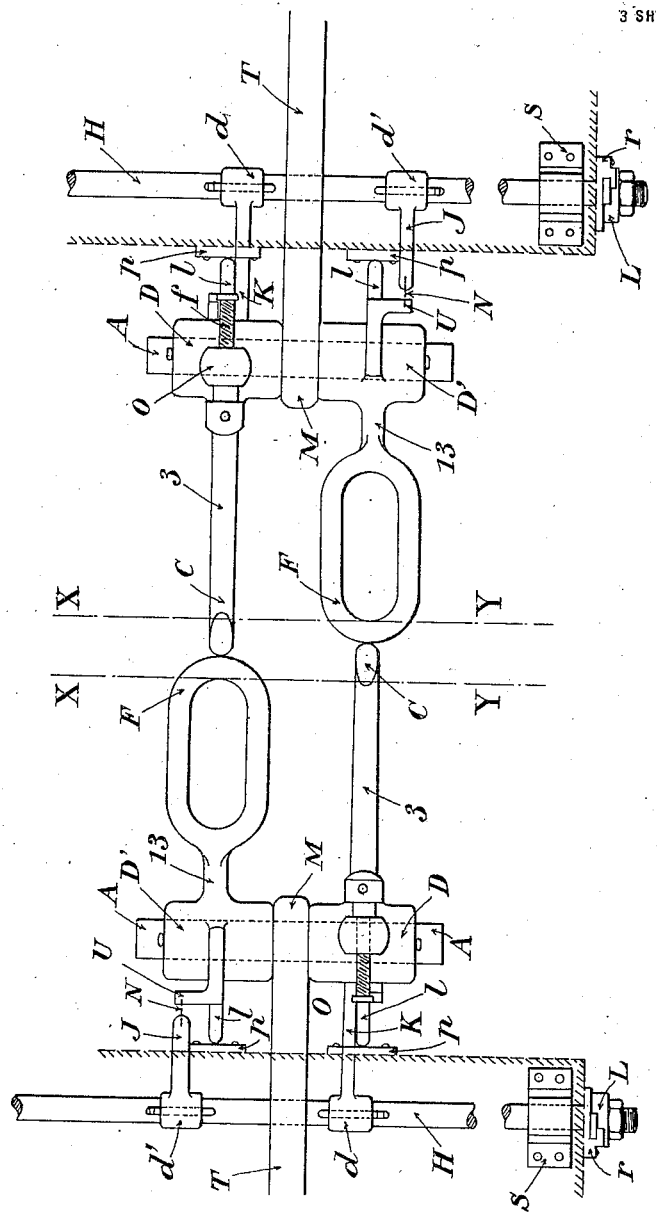
Fig. 2 is a plan view of the same.
Figure 3:
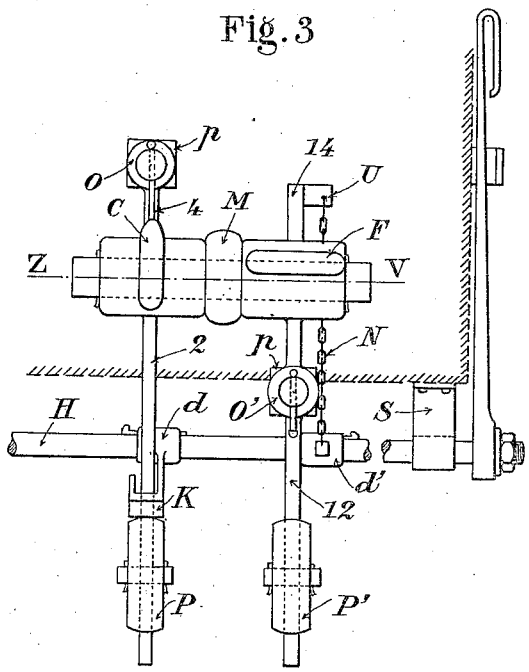
Fig. 3 is an end view of the members disposed upon one of the vehicles.

The sleeves D D' of the coupling members are mounted upon the axle A on either side of the draw bar T, as herein represented. They are loosely pivoted to the axle A which is provided with cross pins to maintain the said sockets. The two coupling members are thus given a determined position. The male member may be moved out of this position of equilibrium by means of the top screw R whereby the point $m$ of the hook C is brought somewhat below the buffer axis Z V. For the female member, the regulating screw R' is used to bring the point $m'$ somewhat above the buffer axis Z V. This operation constitutes the adjustment carried out at the factory for disposing the parts in the position represented in the drawings wherein the shoulders $a$ and $n'$ enter in contact respectively with the arms 4, 14. When subjected to the shock produced when the cars are brought together, the male and female members are caused to swing about the axle A and after a pendular swing of greater or less duration according to the amount of the shock, the said members will assume their respective positions so adjusted. It will thus be observed that if two cars placed together are provided with a hook C and a ring F oppositely disposed as shown in Fig. 2 and if the two cars are brought against each other upon the buffers, the ring F by reason of its adjustment will tend to mount upon the hook C and the said hook will tend to pass under the ring F. Upon the cessation of the impact of a ring or a hook, that is, when the front part of the ring passes beyond the inner side of the corresponding hook end, the rings and hooks will resume their adjusted positions, the ring moving downwardly and the hook upwardly. The rings F and hooks C are now connected together and constitute a car coupling.

Only a violent shock or a pendular swing of great amplitude is susceptible of causing an uncoupling action. Furthermore, an unequal load on the two cars, which is manifested by an unequal flexion of the car springs in the case of two cars to be coupled, thus producing a difference of level in the theoretical buffer axis Z V, is also susceptible of preventing the regular coupling impact, or of facilitating the uncoupling. The adjustment stop pieces R R' serve to break up the pendular movement after the coupling and to regulate the respective heights of the ring F and the hook C for each car after loading the same, by bringing the points $m$, $m'$ to their shop-adjusted level. The said stop pieces are disposed, as herein represented, above the axle A for the male member and below the said axle for the female member. The cars are provided at each end with an uncoupling device, this latter comprising essentially a horizontal shaft H mounted at the forward end of the vehicle and at the lower part of the frame upon two hangers S which are symmetrically disposed with reference to the longitudinal axis of the vehicle. Upon the said shaft and opposite the hook C and the ring F are respectively disposed the two sleeves $d$ $d'$. The sleeve $d$ which is situated opposite the said hook is provided with an arm K the curved end whereof is caused to pass around the large arm 2 of the male member and rests loosely upon the counterweight P. The sleeve $d'$ situated opposite the bent arm U of the female member is provided with an arm J which is connected by a chain N with the arm U.

At each end of the horizontal shaft H is disposed a lever L ending in a handle, the said lever being secured to the shaft by fitting upon a square portion thereof. A retaining catch piece $r$ serves to secure the said lever when in the inoperative position.

To uncouple the two cars, all that is required is to take a position on the outer side next the buffers to seize the handle of each of the levers L now situated to the right and left of the person and to bring them together at the same time towards the plane of the buffers. In this movement, the arm K bears upon the counterweight P of the male member and thereby lowers the hook C, whereas the chain N draws upon the bent arm U of the female member and raises the ring F. These two combined movements serve to produce the uncoupling of the cars.

Figure 4:
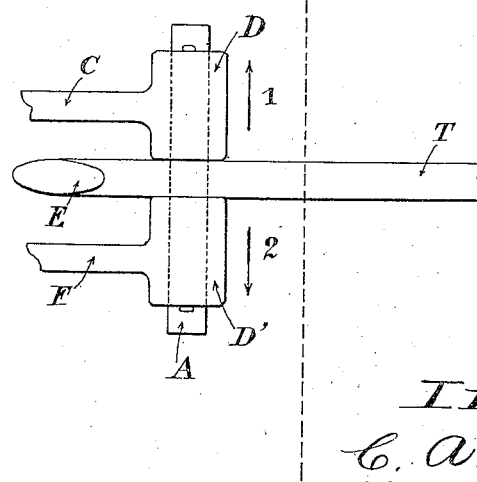
Fig. 4 is a plan view of the disposition used for the coupling of a car provided with the present coupling device and a car which is not provided with the same.

During the transition period of changing over the installation, it is desirable to provide for the coupling between a modified and a non-modified car. To this effect, the axle A is caused to pass through an aperture in the hook E, Fig. 4, which is still in use and is retained in the present case, and the sleeves D and D' are disposed respectively to the right and left of the said hook. Under these conditions the coupling is effected by means of this hook and the ring mounted on the coupler of the non-modified car. Should local conditions make it difficult to effect the movement of the ring between the male and female members of the automatic coupling device, it will be necessary to lengthen the axle A in such manner that the sleeves D, D' may be moved apart in the direction of the arrows 1 and 2, thus facilitating the hook coupling and the required movement of the coupler ring of the known devices. The movement of the sleeves D, D' is limited by the insertion of suitable pins.

Having now described our invention, we declare that what we claim as new and desire to secure by Letters Patent is:

1. An automatic coupling device for railroad cars comprising in combination on each vehicle a hook and a ring respectively cooperating with the corresponding ring and hook of the other vehicle, a horizontal shaft supported by the said vehicle about which the said hook and ring are adapted to pivot independently from each other, a counterweight for each of said hook and ring and an arm connecting each of the latter with said counterweight, the coupling operation being effected under the action of the counterweights.

2. An automatic coupling device for railroad cars comprising in combination on each vehicle a hook and a ring respectively cooperating with the corresponding ring and hook of the other vehicle, a horizontal shaft supported by the said vehicle about which the said hook and ring are adapted to pivot independently from each other, a counterweight for each of said hook and ring, an arm connecting each of the latter with said counterweight and an adjustable screw stop piece provided on each of said hook and ring, the coupling operation being effected under the action of the counterweight and stop pieces.

3. An automatic coupling device for railroad cars comprising in combination on each vehicle a hook and a ring respectively cooperating with the corresponding ring and hook of the other vehicle, a horizontal shaft supported by the said vehicle about which the said hook and ring are adapted to pivot independently from each other, a counterweight for each of said hook and ring, and an arm connecting each of the latter with said counterweight, the coupling operation being effected under the action of the counterweights, a horizontal uncoupling shaft connected to said hook and ring and a hand lever actuating said shaft for effecting the uncoupling operation.

4. An automatic coupling device for railroad cars, comprising in combination on each vehicle a hook and ring respectively cooperating with the corresponding ring and hook of the other vehicle, a horizontal shaft supported by the said vehicle about which the said hook and ring are adapted to pivot independently from each other, a counterweight for each of said hook and ring, an arm connecting each of the latter with said counterweight and an adjustable screw stop piece provided on each of said hook and ring, the coupling operation being effected under the action of the counterweights, a horizontal uncoupling shaft, an arm rigidly connected to said shaft and actuating the counterweight of the hook, a second arm rigidly connected to said shaft, a chain connected at the one end with the free end of said latter arm and at the other end with another arm supported by the said ring, and a hand lever actuating the said shaft for effecting the uncoupling operation.

In testimony whereof we have signed our names to this specification.

CHARLES ANDRÉ MARIE RIBÉRA.
FERNAND ALFRED SERRE.